UNITED STATES PATENT OFFICE.

AUGUST LEOPOLD LASKA, OF OFFENBACH-ON-THE-MAIN, GERMANY, ASSIGNOR TO THE CORPORATION OF CHEMISCHE FABRIK GRIESHEIM ELEKTRON, OF FRANKFORT-ON-THE-MAIN, GERMANY.

MANUFACTURE OF BROWN SULFURIZED VAT DYESTUFFS.

999,045.  Specification of Letters Patent.  Patented July 25, 1911.

No Drawing.  Application filed February 9, 1911. Serial No. 607,604.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with post-office address Dreieichring No. 18, have invented new and useful Improvements in the Manufacture of Brown Sulfurized Vat Dyestuffs, of which the following is a specification.

In the specification of American Letters Patent Nr. 597983 black sulfurized-dyestuffs have been described, obtained by heating with alkali polysulfids 1.5 - dinitroanthraquinone or raw dinitroanthraquinone, obtained by nitrifying anthraquinone, or products of reduction thereof. Now I have found that quite different dyestuffs are obtained by heating the aforesaid anthraquinone derivatives with alkalipolysulfids (preferably under pressure), until a test portion of the products of reaction no longer dissolves in aqueous solutions of alkali sulfids. The thus obtained dyestuffs are insoluble in water, alkali-lyes, and solutions of alkali-sulfids. They bear the properties of vat-dyestuffs and dye from the hydrosulfite-vat cotton very fast olive-brown shades.

The following examples will serve to illustrate the nature of my invention and in what manner the same can be carried out; parts being by weight.

Example I: 480 parts of crystallized sodium sulfid and 195 parts of sulfur are dissolved in 700 parts of water. Into the solution are introduced 150 parts of dinitroanthraquinone, whereupon the mixture is heated up to 200° C. in an autoclave during 12 hours. The melt is diluted with water and the precipitated part separated by straining, washed out with water and dried. The thus obtained dyestuff is a black powder, insoluble in alcohol, water, caustic soda lye and solutions of sodium sulfid. By means of alkaline solutions of hydrosulfite a dark brown vat is obtained dyeing cotton very fast olive-brown shades.

Example II: Into a solution of 750 parts of sodium sulfid and 250 parts of sulfur in 750 parts of water 200 parts of dinitroanthraquinone are introduced and the mixture heated up to 250° C. in an autoclave during 12 hours. The dyestuff is worked up in the same manner as described in Example I. It has essentially the same properties as the dyestuff of Example I.

Example III: Into a solution of 480 parts of crystallized sodium sulfid and 195 parts of sulfur in 700 parts of water 150 parts of diamino-anthraquinone (one of the products of reduction of dinitroanthraquinone) are introduced whereupon the mixture is heated up to 230° C. during 20 hours. The melt is diluted with water and the precipitated dyestuff separated by filtering off and dried. It has essentially the same properties as the dyestuffs of Example I.

Now what I claim and desire to secure by Letters Patent is the following:

1. The process for manufacturing brown sulfurized vat dyestuffs, consisting in heating dinitroanthraquinone, obtained by nitrifying anthraquinone, with alkali polysulfids, until a test portion of the products of reaction no longer dissolves in aqueous solutions of alkali sulfids.

2. As new articles the sulfurized vat dyestuffs obtained by heating with alkali polysulfids the dinitro-anthraquinone, obtained by dinitrifying anthraquinone, until a test portion of the products of reaction no longer dissolves in aqueous solutions of alkali sulfids; which dyestuffs are black powders, insoluble in alcohol, water, caustic soda lye and solutions of sodium sulfid, yielding by means of alkaline hydrosulfite-solutions a dark-brown vat, from which cotton is dyed very fast olive-brown shades.

3. The process of manufacturing a brown sulfurized vat-dyestuff consisting in heating 1.5-dinitroanthraquinone with alkali polysulfids until the products of reaction no longer dissolve in aqueous solutions of alkali sulfids.

4. As new articles the brown sulfurized vat dyestuff obtained by heating 1.5-dinitroanthraquinone with alkalipolysulfids until the products of reaction no longer dissolve in aqueous solutions of alkali sulfids; which dyestuff is a black powder, insoluble in alcohol, water, caustic soda lye, and solutions of sodium sulfid, yielding by means of alkaline hydro-sulfite solution a dark brown vat, from which cotton is dyed very fast olive-brown shades.

In testimony, that I claim the foregoing as my invention, I have signed my name in presence of two witnesses, this twenty-sixth day of January 1911.

AUGUST LEOPOLD LASKA.

Witnesses:
  HERMANN WEIL,
  ROBERT BRIHL.